Aug. 21, 1934.  S. C. ANDALORO  1,970,875
TISSUE PROTECTIVE DENTAL CLAMP
Filed Oct. 12, 1931

Salvator C. Andaloro
Inventor

By Edward H. Geager
Attorney

Patented Aug. 21, 1934

1,970,875

UNITED STATES PATENT OFFICE 1,970,875

TISSUE PROTECTIVE DENTAL CLAMP

Salvatore C. Andaloro, Pittston, Pa.

Application October 12, 1931, Serial No. 568,445

3 Claims. (Cl. 32—36)

The present invention contemplates the provision of an appliance for use by dentists, and by means of which the area of operation is maintained in a perfectly dry condition without discomfort to the patient.

In carrying out my invention I comprehend the provision of an appliance constructed to hold a cotton roll in place and the tongue immovable, so that the operation can be completed without any interruption from tongue movements, which also prevents the tongue from lifting or carrying saliva to the field of operation.

Another object of the invention resides in the provision of an appliance of the above mentioned character constructed to be clamped on the teeth of the patient, and capable of being quickly and conveniently inserted within or removed from the mouth of the patient with a minimum of both time and effort.

A further object of the invention resides in the construction of an appliance of the class in question characterized with a guard flange, which together with the tongue guard will prevent lacerations of the tongue or soft tissues in the mouth, should a revolving burr or other dental instrument slip off the tooth being treated.

The invention aims to provide an appliance of this character possessing simplicity in construction, and with this object in view the tongue guard per se forms one of the complementary jaws of the clamp for direct engagement with the teeth of the patient.

A still further object of the invention resides in utilizing the tongue guard as one jaw of the clamp, and forming the same to cover an appreciable portion of the tongue to prevent movement thereof, and also employed to effectively maintain the roll of cotton in position within the mouth.

It is my purpose to construct an appliance for the purposes above mentioned, which when positioned within the mouth of the patient will not interfere with or hinder the dentist in the performance of the work to be done in any way whatsoever.

The nature and advantages of the invention will be better understood when the following detail description is read in connection with the accompanying drawing, the invention residing in the construction, combination and arrangement of parts as claimed.

In the drawing forming part of this application like numerals of reference indicate similar parts in the several views and wherein.

Figure 1:
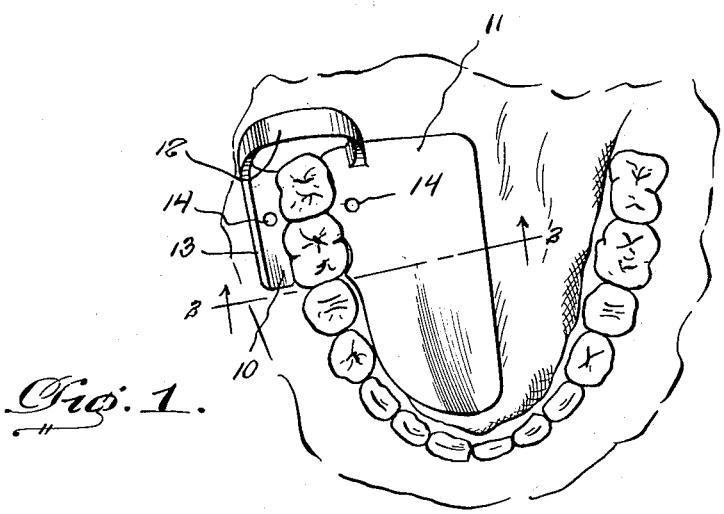
Figure 1 is a view showing how the invention is used.
Figure 2:
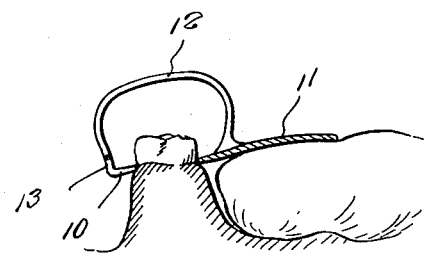
Figure 2 is a sectional view on line 2—2 of Figure 1.
Figure 3:
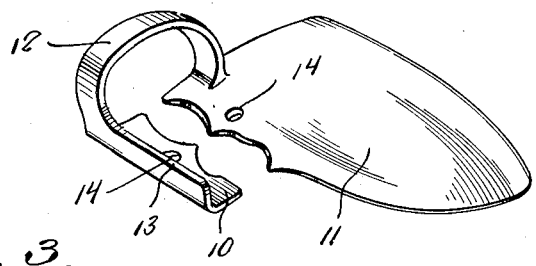
Figure 3 is a perspective view.

The appliance forming the subject matter of the present invention may be constructed from any suitable material and also vary in size and contour without departing from the inventive idea. Obviously the appliance is adapted to be clamped on the teeth of the patient as illustrated in Figure 1, to maintain the area of operation in a dry condition. For this purpose the appliance embodies two complementary clamping jaws 10 and 11 respectively of relatively different designs and dimensions for a purpose to be hereinafter described. The jaws are preferably in the nature of elongated plates and have their adjacent longitudinal edges provided with plurality of pairs of notches to receive the adjacent teeth of the patient, on which the appliance is clamped for use. Any number of said notches may be provided, depending of course upon the size of the particular appliance, although I have illustrated two pairs of such notches, the notches of one pair being slightly larger than those of the other pair. The jaws 10 and 11 are resiliently connected together at one end by any suitable means, preferably a bowed spring 12 which tends to move the jaws toward each other into gripping relation. The jaw 10 is relatively short and narrow, and rising from the outer longitudinal edge thereof is a guard flange 13. The spring 12 preferably extends from this flange 13 as illustrated and is connected with the jaw 11 adjacent the end thereof.

The jaw 11 is relatively long and wide and in addition to forming part of the clamp constitutes a tongue guard, adapted to repose upon the tongue and maintain the latter against movement. The jaw 11 is slightly convexed and has one edge curved toward the forward end thereof to conform to the shape of the tongue, so that the appliance can be used in the manner illustrated without discomfort to the patient. By virtue of the size and shape of the combined jaw and tongue guard 11, and the flange 13 of the jaw 10, lacerations of the tongue or soft tissues of the mouth is prevented, should a revolving burr or other instrument slip off the tooth being treated thereby. The jaws 10 and 11 may if desired be provided with small openings 14 to accommodate a suitable tool to facilitate placing the appliance in position for use or removing the same from the mouth of the patient.

In practice, the appliance is clamped on the teeth of the patient as illustrated in Figure 1, the location of the spring 12 being such that the appliance does not in any way interfere with or hinder the dentist in the operation to be performed. The usual cotton roll is adapted to be clamped in place beneath the jaw 11, and as the latter by reason of its contour holds the tongue against movement, the operation can be more quickly and conveniently completed without any interruption of tongue movements. This materially assists in maintaining the field of operation in a perfectly dry condition, as the jaw 11 prevents the tongue from lifting or carrying saliva to the area of operation. The device is so constructed that the tongue falls in place causing it to relax, bringing about comfort to the patient. Manifestly the appliance in its entirety comprises a minimum of parts, and its simplicity of construction permits of its being manufactured and sold at a nominal cost.

While it is believed that from the foregoing description the nature and advantages of the invention will be readily apparent, I desire to have it understood that I do not limit myself to the construction herein illustrated or described, and that such changes may be resorted to when desired as fall within the scope of what is claimed.

What is claimed is:

1. In a dental appliance of the class described, a tongue guard in the form of a plate to overlie the tongue and formed in one edge with a tooth-engaging recess, a second plate to bear against the outer side of the teeth, and an element resiliently connecting said plates to compel their clamping cooperation with a tooth, the outer edge of the second plate relative to the teeth presenting an abrupt uninterrupted upstanding flange of sufficient height to prevent a treating tool from riding off such second plate and into contact with the tissue beyond such second plate.

2. In a dental appliance of the class described a plate to overlie the tongue and bear against the inner side of the teeth, a second plate to bear against the outer side of the teeth, the proximate edges of the plates being formed to interfit with at least one tooth, the outer edge of the second plate being provided with an abrupt uninterrupted upstanding flange coextensive with the length of the plate to serve as a tool guard, and a spring strip rising from the upper edge of said flange and terminally connected to the first-mentioned plate, said spring strip insuring tooth-gripping cooperation of the plates.

3. In a dental appliance of the class described, a plate to overlie the tongue and bear against the inner side of the teeth, a second plate to bear against the outer side of the teeth, the proximate edges of the plates being formed to interfit with at least one tooth, an upstanding right-angularly disposed flange bent from the outer edge of the second mentioned plate and coextensive with the length thereof to provide an uninterrupted tool guard, and a spring strip rising from the upper edge of the flange and terminally connected to the first mentioned plate to insure tooth-gripping cooperation of the plate.

SALVATORE C. ANDALORO.